United States Patent
Luttman et al.

(10) Patent No.: US 8,341,306 B1
(45) Date of Patent: Dec. 25, 2012

(54) INSTALLATION OF A DEVICE DRIVER AND A FILTER DRIVER

(75) Inventors: Eric J. Luttman, Eagle, ID (US); Jay R. Shoen, Boise, ID (US); Lyman Leonard Hall, Meridian, ID (US)

(73) Assignee: Marvell International Ltd., Hamilton (BM)

( * ) Notice: Subject to any disclaimer, the term of this patent is extended or adjusted under 35 U.S.C. 154(b) by 257 days.

(21) Appl. No.: 12/501,277

(22) Filed: Jul. 10, 2009

Related U.S. Application Data

(60) Provisional application No. 61/082,390, filed on Jul. 21, 2008.

(51) Int. Cl.
*G06F 3/00* (2006.01)
*G06F 3/38* (2006.01)
*G06F 12/00* (2006.01)
*G06F 12/02* (2006.01)

(52) U.S. Cl. .................................. 710/13; 711/115
(58) Field of Classification Search ...................... 710/13
See application file for complete search history.

(56) References Cited

U.S. PATENT DOCUMENTS

| | | | |
|---|---|---|---|
| 6,012,103 A | 1/2000 | Sartore et al. | |
| 6,754,725 B1 | 6/2004 | Wright et al. | |
| 6,898,653 B2 * | 5/2005 | Su et al. | 710/302 |
| 2007/0047524 A1 | 3/2007 | Moriya | |
| 2007/0260763 A1 * | 11/2007 | Kasama | 710/8 |
| 2008/0195768 A1 * | 8/2008 | Lowe et al. | 710/14 |

FOREIGN PATENT DOCUMENTS

WO  WO 2008065886 A1 *  6/2008

* cited by examiner

*Primary Examiner* — Chun-Kuan Lee
*Assistant Examiner* — Brooke Taylor

(57) ABSTRACT

Some of the embodiments of the present disclosure provide a method comprising coupling a first device to a client device, the first device having a virtual storage drive, the virtual storage drive storing a device driver; installing the device driver in the client device; and subsequent to installation of the device driver in the client device, installing a filter driver in the client device, the filter driver configured to prevent the client device from detecting the virtual storage drive of the first device whenever the first device is subsequently re-coupled to the client device. Other embodiments are also described and claimed.

20 Claims, 4 Drawing Sheets

INSTALLATION OF A DEVICE DRIVER AND A FILTER DRIVER

CROSS REFERENCE TO RELATED APPLICATIONS

The present application claims priority to U.S. Patent Application No. 61/082,390 filed Jul. 21, 2008, the entire specification of which is hereby incorporated by reference its entirety for all purposes, except for those sections, if any, that are inconsistent with this specification.

TECHNICAL FIELD

Embodiments of the present invention relate to installation of a device driver in a client device.

BACKGROUND

FIG. 1 schematically illustrates an exemplary computing system 10 that includes a client device 14 and a device 18. The client device 14 may be, for example, a desktop computer, a laptop, a server, and the like. The device 18 may be any appropriate device that may provide one or more services to the client device 14, including but not limited to a printer, a copier, a fax machine, a webcam, a television, a set-top box, a camera, or any other appropriate type of appliance or peripheral. The device 18 may be operatively coupled to the client device 14 through an appropriate link 26, e.g., a universal serial bus (USB) link, a wired or wireless network connection, a Bluetooth connection, a serial port connection, a parallel port connection, and the like.

In order for the client device 14 to fully utilize the functionalities of the device 18, an appropriate driver software typically needs to be loaded, installed, and configured in the client device 14, as is well known in the art. For example, if the device 18 is a printer, a printer driver of appropriate type generally needs to be installed and configured in the client device 14 to enable the client device 14 to access and print to the printer 18.

System 10 of FIG. 1 also includes a driver 22, suitable for device 18, which is available to the client device 14 for loading and installation. In various applications, the driver 22 may be available in an appropriate external storage device, e.g., a CD ROM, a flash drive, etc. Alternatively, the client device 14 may also access the driver 22 from an external server (e.g., a print server), and/or over a network (e.g., using the Internet or an intranet, from a website of the manufacturer or seller of the device 18, etc.).

Thus, in addition to having access to the device 18, the client device 14 or a user of the client device 14 may further need access to the appropriate driver 22. Often, the user of the client device 14 may not be have access to the driver 22 and/or may not be sure about the appropriate driver to be installed. Installing the driver 22 from an external storage, an external server or over a network may also be confusing to the user of the client device 14, as many different types drivers (e.g., if device 18 is a printer, different printer drivers for different types of printers) may be available, from which the user may have to select the correct driver.

Put differently, it may be difficult and/or confusing for a user of the client device 14 to obtain the driver 22. At the least, scouting for a device driver may negatively impact a user's experience, perception and/or satisfaction about the device 18.

SUMMARY

In various embodiments, the present disclosure provides an apparatus and a method for a installing a device driver and a filter driver in a client device. There is provided, a method comprising coupling a first device to a client device, the first device having a virtual storage drive, the virtual storage drive storing a device driver; installing the device driver in the client device; and subsequent to installation of the device driver in the client device, installing a filter driver in the client device, the filter driver configured to prevent the client device from detecting the virtual storage drive of the first device whenever the first device is subsequently re-coupled to the client device.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase at least one of A, B and C" means (A), (B), (C), (A and B), (A and C), (B and C) or (A, B and C). The phrase "(A) B" means (B) or (A and B), that is, A is optional.

Figure 1:
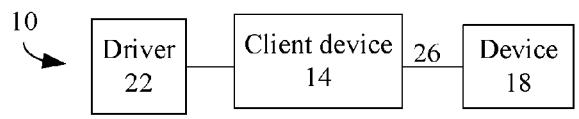
FIG. 1 schematically illustrates an exemplary computing system that includes a client device and a device.
Figure 2:
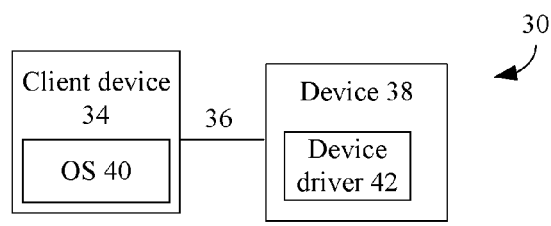
FIG. 2 schematically illustrates an exemplary system that includes a client device operatively coupled to a device through a link.

FIG. 2 schematically illustrates an exemplary system 30 that includes a client device 34 operatively coupled to a device 38 through a link 36. The client device 34 may be, for example, a desktop computer, a laptop, a server, and the like, and may operate with an appropriate type of operating system (OS) 40, e.g., Microsoft Windows®, Macintosh®, Linux®, etc. The device 38 may be, for example, a printer (e.g., a color printer, a monochrome printer, a multifunction printer that includes additional capabilities like scanning, faxing, copying, etc.), a fax machine, a copier, a scanner, a webcam, a camera, a television, or any other appropriate type of peripheral, appliance and/or a service providing device, and may have capability to communicate with the client device 34 and possibly provide one or more services to the client device 34. For example, if the device 38 is a printer, the client device 34 may avail printing services offered by the device 38 by printing image data on the device 38.

As shown in FIG. 2, the client device 34 is operatively coupled to the device 38 through a link 36. The link 36 may be of any appropriate type, including but not limited to a USB link, a wired or wireless network connection (e.g., a home or corporate network, an intranet, the Internet, a local area network (LAN), a wide area network (WAN), etc.), a Bluetooth connection, a serial port connection, a parallel port connection, and the like.

The device 38 also includes device driver software 42 that is appropriate for the device 38, stored as firmware or embedded software in device 38. For example, if the device 38 is a printer, the device driver 42 corresponds to a print driver appropriate for the printer 38. In various embodiments, although not illustrated in FIG. 2, the device 38 may include a storage unit (e.g., a read only memory (ROM), a flash memory, or any other appropriate type of memory), and the device driver 42 may be stored in said storage unit.

In various embodiments, a manufacturer or seller may upload the driver 42 in the device 38 during manufacturing or selling of the device 38. In various other embodiments, the device 38 may download the device driver 42, for example, from the manufacturer's website (or from a server, e.g., a print server) over a network (not illustrated in FIG. 2). Other ways of including the driver 42 in the device 38 may also be envisioned by those skilled in the art (e.g., a system administrator or a user may upload the driver 42, from an external storage device, to the device 38).

The device 38 may also include several components (not illustrated in FIG. 2) that are well known to those skilled in the art. For example, if the device 38 is a printer, then the device 38 may also include appropriate components required for printing, as is well known to those skilled in the art.

In order for the client device 34 to utilize the functionalities of the device 38, an appropriate driver software of the device 38 generally needs to be loaded, installed, and configured in the client device 34. Accordingly, the device 38 may install the device driver 42 in the client device 34. Subsequent to installation of the device driver 42, the client device 34 may effectively communicate with the device 38 and/or avail one or more services offered by the device 38 (e.g., print a page if device 38 is a printer, download photos or videos if device 38 is a camera or a webcam, change a television channel if device 38 is a television, configure the device 38 from the client device 34, etc.).

Figure 3:
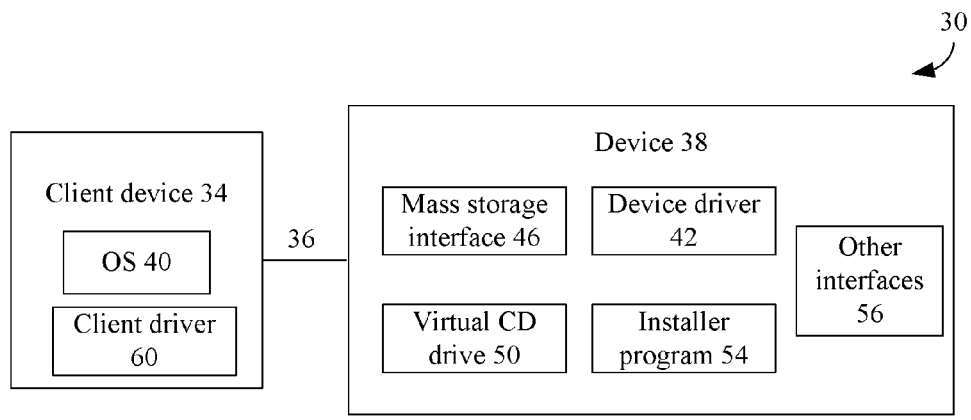
FIG. 3 schematically illustrates the exemplary system of FIG. 2 in more detail.

FIG. 3 schematically illustrates the exemplary system 30 of FIG. 2 in more detail. More specifically, FIG. 3 illustrates in more detail various components of the device 38. As shown in FIG. 3, the device 38 includes, apart from the previously discussed device driver 42, a mass storage interface 46, a virtual compact disk (CD) drive 50, an installer program 54, and one or more other interfaces 56. In general, some or all the components illustrated in device 38 may be combined. For example, although the device driver 42 and the installer program 54 are illustrated as separate components, in various embodiments, the installer program 54 may be a part of the device driver 42.

In various embodiments, the virtual CD drive 50 is a virtual storage drive and is configured to emulate a real CD drive during an operation of the device 38. Virtual CD drives are well known to those skilled in the art. In various embodiments, the installer program 54 is stored in the virtual CD drive. In various other embodiments, the virtual CD drive 50 includes a pointer to the installer program 54. Thus, the installer program 54 may be stored in the virtual CD drive 50 and/or in any other appropriate storage element (not illustrated in FIG. 3) in the device 38. In various embodiments, the installer program 54, when executed (possibly by the OS 40), is configured to cause the device driver 42 to be installed in the client device 34, as will be discussed in more detail herein later.

One or more other interfaces 56 may be any interface (other than the mass storage interface 46) necessary and appropriate for proper operation of the device 38. For example, in various embodiments, the interface 56 is a print interface.

As is well known to those skilled in the art, an enumeration process involves discovering, by a host, a USB device and/or several properties of the USB device through exchange of signals between the host and the USB device once the host and the USB device are operatively coupled, and may also involve assignment of an address to the USB device and/or configuration of the USB device by the host.

In various embodiments, when the device 38 is coupled to the client device 34 for the first time, the device 38 reports the mass storage interface 46 to the client device 34. For example, if the device 38 is coupled to the client device 34 through a USB link 36, the device 38 reports the mass storage interface 46 to the client device 34 during an enumeration process of the device 38. Upon discovering the mass storage interface 38, the client device 34 views the device 38 as a mass storage device. During the enumeration process, the mass storage interface 46 also enumerates the virtual CD drive 50 to the device 38.

In one embodiment, when the device 38 is coupled to the client device 34 for the first time, the client device 34 (e.g., the OS 40) views the device 38 as a mass storage device and/or detects the presence of the mass storage interface 46 and/or the virtual CD drive 50 in the device 38.

In various embodiments, although the client device 34 may detect the presence of the virtual CD drive 50, the client device 34 may not be aware that the virtual CD drive 50 is a "virtual" drive. That is, the client device 34 may assume the virtual CD drive 50 to be a regular CD drive (as virtual CD drives may be configured to emulate a regular CD drive).

As previously discussed, the client device 34 may operate on an appropriate OS 40, e.g., Microsoft Windows® operating system. As is well known to those skilled in the art, if an operating system (e.g., Windows XP®, Windows Vista®, etc.) in a client devices detect a CD drive in a device coupled to the client device over a USB link, the OS may launch an auto-play program that is configured to auto-launch the CD drive. Thus, in various embodiments, OS 40 of the client device 34 detects the virtual CD drive 50 in the device 38 whenever the device 38 is coupled to the client device 34 for the first time, and the OS 60 executes an auto-play program configured to auto-launch the virtual CD drive 50. As is well known to those skilled in the art, such auto-play program and/or auto-launching of the virtual CD drive 50 may cause a dialog box (e.g., a auto-play prompt) and/or other visual indication to appear in a display screen of the client device 34. Thus, with the auto-launch of the virtual CD drive 50, the virtual CD drive 50 may be mounted in the client device 34.

As previously discussed, the virtual CD drive 50 in the client device 38 may include the installer program 54 (or a pointer to the installer program 54). Thus, once the client device 34 auto-launches the virtual CD drive 50, the installer program 54 may be executed (possibly after being loaded in the client driver 34), which may cause the device driver 42 to be installed in the client device 34 as client driver 60. Thus, the device 38 may install the client driver 60 in the client device 34, and the client device 34 may then avail one or more service offered by the device 38.

After the client driver 60 has been installed in the client device 34, the device 38 may be operatively decoupled from the client device 34 (i.e., the link 36 may be disconnected from the device 38 and/or the client device 34) for any reason, and operatively coupled once again. Alternatively, the client device 34 and/or the device 38 may be switched off, and then switched back once again. For the purpose of this disclosure and unless otherwise stated, in various embodiments, any such event occurring after the successful installation of the client driver 60 in the client device 34 is referred to as re-coupling the client device 34 and the device 38. Accordingly, in various embodiments, "re-coupling" may refer to, for example, operatively disconnecting and re-connecting the device 38 to the client device 34 subsequent to the successful installation of the client driver 60. Alternatively, in various embodiments, a re-coupling may also refer to switching off and then on the client device 34 and/or the device 38 subsequent to the successful installation of the client driver 60.

In various embodiments, one the device 38 is re-coupled to the client device 34, the client device 34 may again enumerate the device 38, detect the virtual CD drive 50, and launch the auto-play program once again. That is, the OS 40 may once again auto-launch the virtual CD drive 50 and may try to execute the installer program 54. The installer program 54 may be configured to check whether the device driver 42 has already been installed in the client device 34 as client driver 60 and thereby prevent any re-installation of the driver 42 in the client device 34. However, the auto-playing of the virtual CD 50, each time the device 38 is re-coupled to the client device 34, may be confusing to a user of client device 34. For example, when the OS 40 executes the auto-play program upon detecting the virtual CD drive 50 and auto-launches the virtual CD drive 50, certain dialog box and/or other visual indication for the auto-play prompt and/or auto-launch may appear in the display screen of the client device 34. Appearance of such visual indication every time the client device 34 is re-coupled to the device 38 may be confusing to the user of the client device 34.

Accordingly, in various embodiments, it may be desirable to prevent the OS 40 from executing the auto-play program and the auto-launching of the virtual CD drive 50 every time such re-coupling is performed. One way to achieve this may be to uninstall, disable and/or remove the virtual CD drive 50 and/or the mass storage interface 46 from the device 38 upon successful installation of the device driver 42 in the client device 34. This may ensure that the OS 40 does not detect the virtual CD drive 50 during a re-coupling, hence, does not execute the auto-play program. However, if the virtual CD drive 50 and/or the mass storage interface 46 are uninstalled, disabled and/or removed from the device 38, the device 38 may not be able to successfully install the device driver 42 to one or more other client devices (not illustrated in FIG. 3) when the one or more other client devices are coupled to the device 38. Additionally, if the client driver 60 is ever uninstalled by the client device 34 or its user for any reason, the device 38 may not be able to re-install the driver 42 because of the un-installation, disablement and/or removal of the virtual CD drive 50 and/or the mass storage interface 46 in the device 38.

Figure 4:
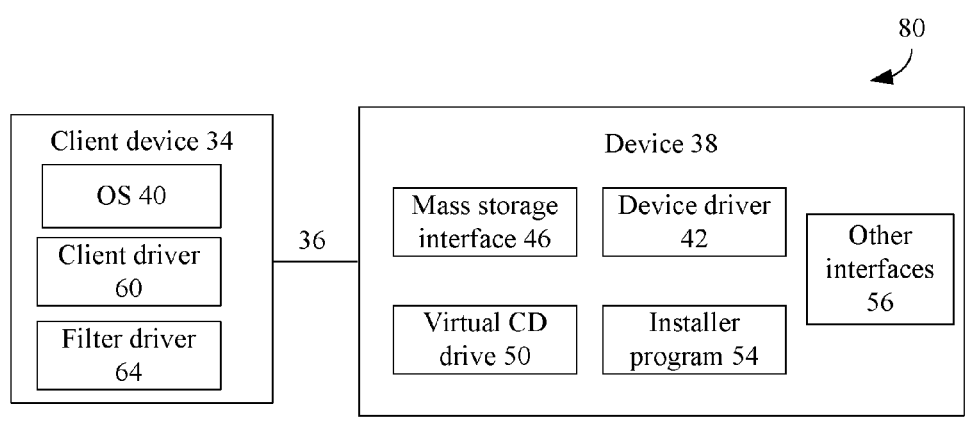
FIG. 4 schematically illustrates another exemplary system that includes the client device operatively coupled to the device.

FIG. 4 schematically illustrates an exemplary system 80 that includes the client device 34 operatively coupled to the device 38. The system 80 of FIG. 4 may be at least partially similar to the system 30 of FIG. 3, except for some differences that will be discussed in more detail herein later.

As previously discussed, the device 38 may install the device driver 42 in the client device 34 as client driver 60. In various embodiments, subsequent to successfully installing the client driver 60, the device 38 (e.g., the installer program 54 and/or the device driver program 42) also installs a filter driver 64 in the client device 34. As is well known to those skilled in the art, a filter driver may be a Microsoft Windows driver that may add value to a peripheral device or support a specialized device in a client device, and may be a driver, program, and/or module that may be inserted into the existing driver stack of the client device to perform one or more specific functions.

Thus, the filter driver 64 may be added to an existing driver stack of the client device 34. In various embodiments, a configuration information of the mass storage interface 46 may exist at an appropriate location (not illustrated in FIG. 4) in the client device 34, and the filter driver 64 (or information about the filter driver 64 or a pointer to the filter driver 64) may be added to such configuration information.

In various embodiments, the filter driver 64 is configured to prevent the device 38 from mounting the virtual CD drive 50 in the client device 34 whenever the device 38 is re-coupled to the client device 34. That is, in various embodiments, during enumeration of the device 38 whenever the device 38 is re-coupled to the client device 34, the filter driver 64 prevents the OS 40 from detecting the virtual CD drive 50. For example, during the enumeration process in the course of such re-coupling, the client device 34 may enumerate the mass storage interface 46. However, in various embodiments, the filter driver 64 prevents the mass storage interface 46 from reporting the virtual CD drive 50 to the OS 40 (or even if such reporting is made, the filter driver 64 may instruct the OS 40 to ignore the presence of the virtual CD drive 50). In various other embodiments, the filter driver prevents the OS 40 from enumerating the mass storage interface 46, and the OS 40 only enumerates the other interfaces 54 (e.g., a print interface) during such re-coupling.

In one embodiment, the filter driver 64 prevents the client device 34 (e.g., the OS 40) from detecting the virtual CD drive 50 and/or the mass storage interface 46 during re-coupling the client device 34 to the device 38, thus preventing the virtual CD drive 50 from mounting in the client device 34. As the OS 40 does not detect the virtual CD drive 50, the OS 40 does not execute the auto-play program, thereby preventing the auto-launch of the virtual CD drive 50, and thereby creating less confusion to the user of the client device 34 and enhancing the user's experience with the device 38.

Also, as the filter driver 64 does not affect any of the components of the device 38 (e.g., the virtual CD drive 50 and/or the mass storage interface 46), the device 38 may install the driver 42 in any other client device (other than the client device 34 in which the filter driver 60 is already installed) to which the device 38 may be coupled.

If the client device 34 and/or its user uninstall the client driver 60 for any reason, the filter driver 64 may also be removed, deleted and/or uninstalled. Thus, after any such un-installation, if the device 38 is once again coupled to the client device 34, the OS 40 may enumerate the device 38, detect the presence of the virtual CD drive 50, execute the auto-play program, and auto-launch the installer program 54, which may cause the device driver 42 to be installed once again as client driver 60 in the client device 34.

Figure 5:
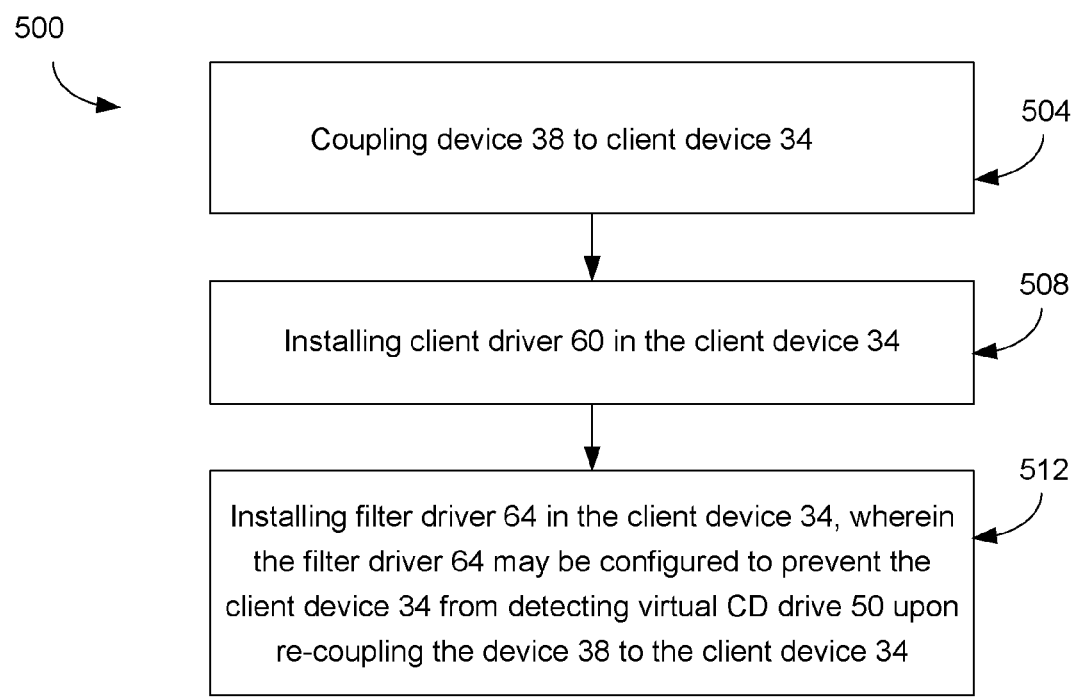
FIG. 5 illustrates an exemplary method for installing a client driver along with a filter driver in the client device of FIG. 4.

FIG. 5 illustrates an exemplary method 500 for installing the client driver 60 along with the filter driver 64 in the client device 34. Referring to FIGS. 4 and 5, the method 500 includes, at 504, coupling the device 38 to the client device 34. At 508, the device 38 installs the client driver 60 in the client device 34. Subsequent to successfully installing the client driver 60, at 512, the device 38 also installs the filter driver 64 in the client device 34, wherein the filter driver 64 is configured to prevent the client device 34 from detecting the virtual CD drive 50 in the device 38 upon re-coupling the device 38 to the client device 34.

Figure 6:
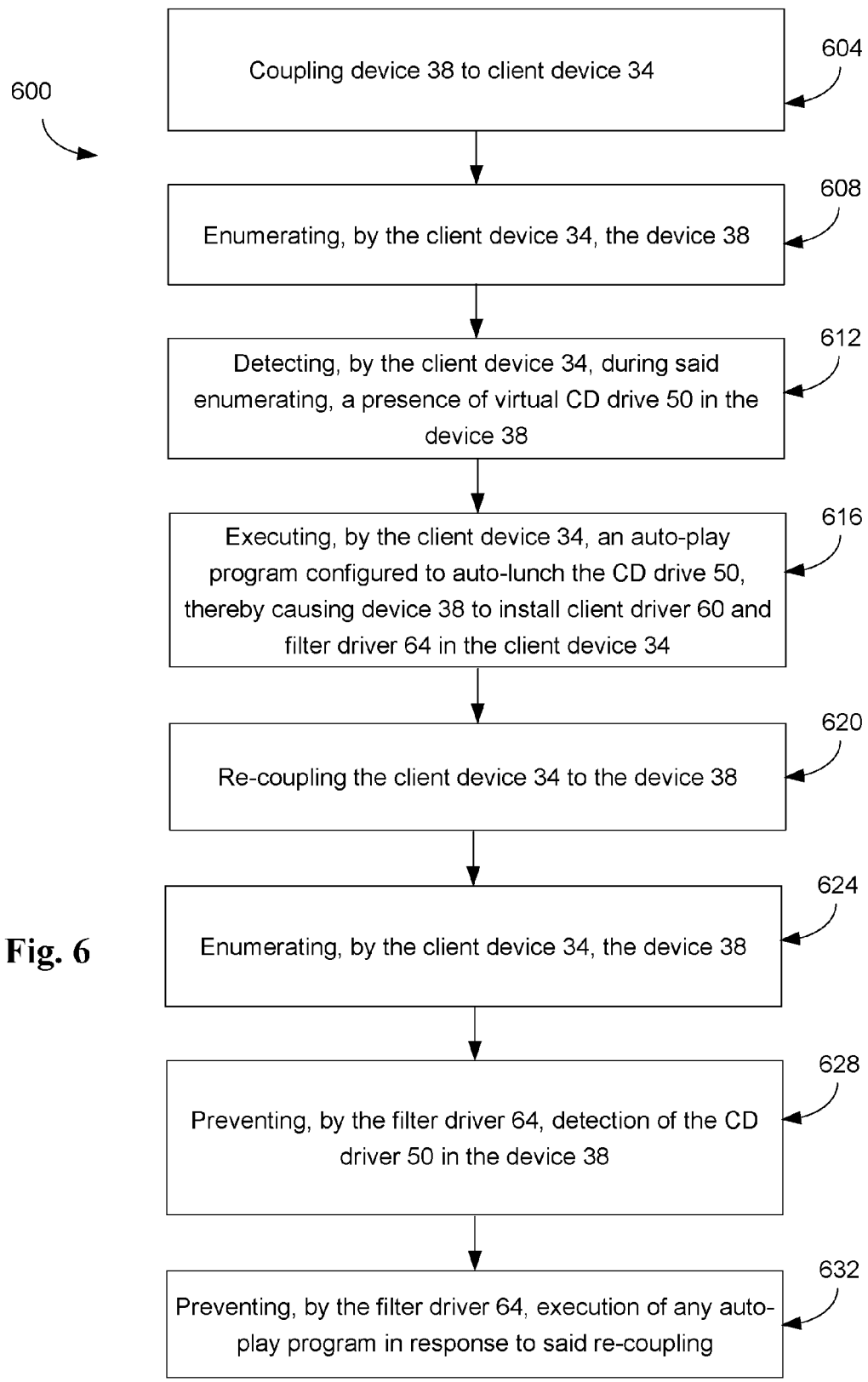
FIG. 6 illustrates an exemplary method for preventing an execution of an auto-play program while re-coupling the device and the client device of FIG. 4.

FIG. 6 illustrates an exemplary method 600 for preventing an execution of an auto-play program while re-coupling the device 38 and the client device 34. Referring to FIGS. 4 and 6, at 604, the device 38 is coupled to the client device 34. At 608, the client device 34 enumerates the device 38. During the enumeration process, at 612, the client device 34 detects a presence of the virtual CD drive 50 in the device 38. As previously discussed, the client device 34 may assume the virtual CD drive 50 to be a regular CD drive (as virtual CD drives may be configured to emulate a regular CD drive).

At 616, the client device 34 executes an auto-play program configured to auto-launch the virtual CD drive 50, thereby causing device 38 (or the installer program 54) to install the client driver 60 and the filter driver 64 in the client device 34, as has been previously discussed in more detail herein.

At 620, the client device 34 may be re-coupled to the device 38. At 624, the client device 34 again enumerates the device 38. During this enumeration process, at 628, the filter driver 64 prevents the client device 34 from detecting the virtual CD drive 50 in the device 38, as has been previously discussed in more detail herein. As a result, the filter driver 64 also prevents execution of any auto-play program in the client device 34 in response to the re-coupling of the client device 34 and the device 38 at 620, thereby preventing the mounting of the virtual CD drive 50 in the client device 34 during re-coupling.

Figure 7:
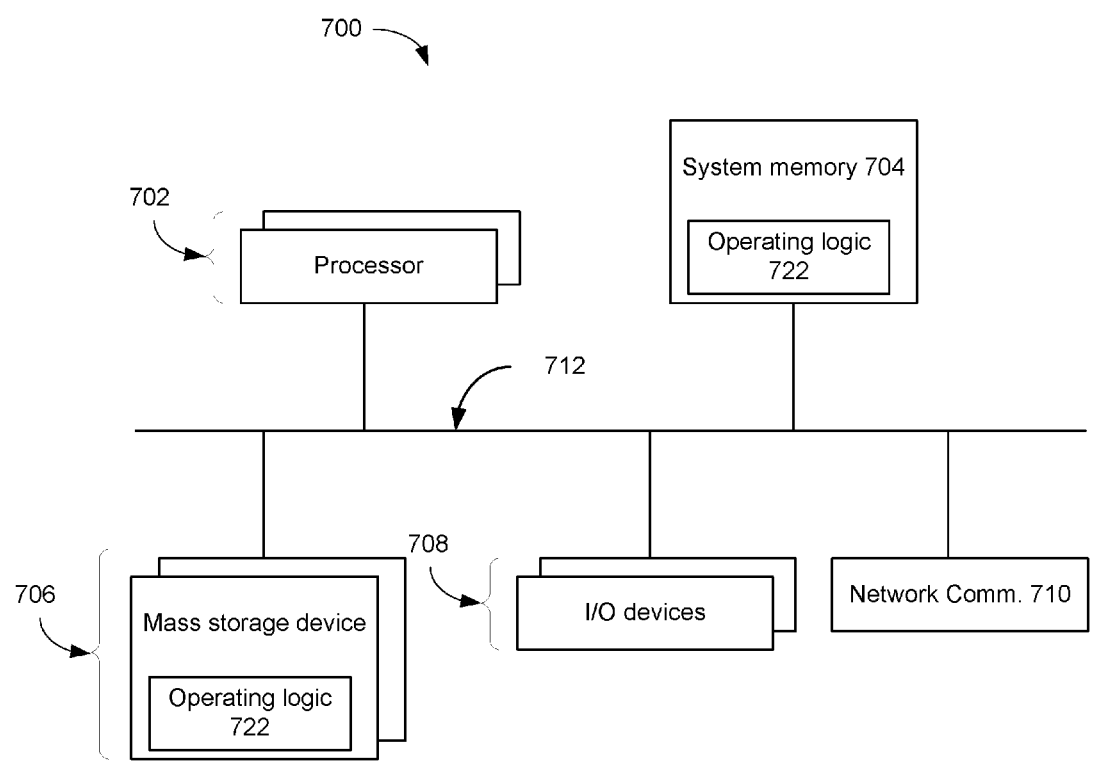
FIG. 7 is a block diagram of an exemplary system suitable for use to practice the present invention.

FIG. 7 is a block diagram of an exemplary system 700 suitable for use to practice the present invention. As illustrated, system 700 includes one or more processors or processor cores 702, and system memory 704. For the purpose of this application, including the claims, the terms "processor" and "processor cores" may be considered synonymous, unless the context clearly requires otherwise. Additionally, system 700 includes mass storage devices 706 (such as diskette, hard drive, compact disc read only memory (CDROM) and so forth), input/output devices 708 and communication interfaces 710 (such as network interface cards, modems and so forth). The elements of FIG. 7 are shown to be coupled to each other via system bus 712, which may represent one or more buses. In the case of multiple buses, the multiple buses may be bridged by one or more bus bridges (not illustrated).

Each of these elements performs its conventional functions known in the art. In particular, system memory 704 and mass storage 706 may be employed to store a working copy and a permanent copy of the programming instructions implementing all or a portion of earlier described functions, herein collectively denoted as 722. The instructions 722 may be assembler instructions supported by processor(s) 702 or instructions that can be compiled from high level languages, such as C.

The permanent copy of the programming instructions may be placed into permanent storage 706 in the factory, or in the field, through, for example, a distribution medium (not shown), such as a compact disc (CD), or through communication interface 710 (from a distribution server (not shown)). That is, one or more distribution media having instructions 722 may be employed to distribute the instructions 722 and program various client devices. The constitution of these elements 702-712 are generally well known, and accordingly will not be further described.

In various embodiments, the system 700 may be configured to operate as the client device 34 of FIG. 4. In various embodiments, the system 700 may have a Microsoft Windows® operating system (e.g., Windows XP, Vista, etc.) installed. The system 700 may further be configured to be coupled to the device 38 through USB link 36. One or more instructions stored in the system memory 704 and/or storage device 706 may cause the system 700 to enumerate the device 38, detect the presence of the virtual CD drive 50, and cause the device 38 to install the client driver 60 and the filter driver 64 in the system 700. In various embodiments, one or more instructions associated with the client driver 60 and/or the filter driver 64 may be stored in the system memory 704 and/or storage device 706. In various embodiments, the filter driver 64 installed in the system 700 may prevent the system 700 from detecting the virtual CD drive 50 during any subsequent re-coupling of the device 38 and the client device 34.

In various embodiments, the system 700 may also be configured to operate as the device 38 of FIG. 4, and may include several components, such as storage units (e.g., system memory 704 and/or storage device 706) to store one or more instructions associated with the device driver 42 and/or the installer program 54, the mass storage interface 46, virtual CD drive 50, one or more other interfaces 56 (e.g., a print interface if device 38 is a printer), and one or more other components not illustrated in FIG. 4 or 7 (e.g., a printing mechanism). The system 700 may be configured to be coupled to the client device 34 and provide one or more services to the client device 34. The system 700 may also be configured to install the client driver 60 and the filter driver 64 in the client device 34 the first time the client device 34 is coupled to the device 38. One or more instructions (e.g., instructions 722) stored in the system memory 704 and/or storage device 706 may facilitate one or more operations of the system 700.

Although specific embodiments have been illustrated and described herein, it will be appreciated by those of ordinary skill in the art and others, that a wide variety of alternate and/or equivalent implementations may be substituted for the specific embodiment illustrated and described without departing from the scope of the present invention. This present invention covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein. Therefore, it is manifested and intended that the invention be limited only by the claims and the equivalents thereof.

What is claimed is:

1. A method comprising:
coupling a first device to a client device, the first device having a virtual storage drive, the virtual storage drive storing a device driver;
installing the device driver in the client device; and
subsequent to installation of the device driver in the client device, installing a filter driver in the client device, the filter driver configured to prevent the client device from detecting the virtual storage drive of the first device whenever the first device is subsequently re-coupled to the client device,
wherein installing the filter driver comprises inserting the filter driver into a driver stack of the client device.

2. A method comprising:
coupling a first device to a client device, the first device having a virtual storage drive, the virtual storage drive storing a device driver;
installing the device driver in the client device; and
subsequent to installation of the device driver in the client device, installing a filter driver in the client device, the filter driver configured to prevent the client device from detecting the virtual storage drive of the first device whenever the first device is subsequently re-coupled to the client device,
wherein the filter driver is further configured to prevent an auto-play program from being executed in the client device in response to the first device being re-coupled to the client device.

3. The method of claim 1, wherein the filter driver is further configured to prevent the first device from mounting the virtual storage drive in the client device whenever the first device is subsequently re-coupled to the client device.

4. The method of claim 1, wherein installing the device driver in the client device further comprises:
reporting, by the first device, a mass storage interface to the client device subsequent to the first device being coupled to the client device, the mass storage interface on the first device configured to enumerate the virtual storage drive to the client device, the virtual storage drive including an installer program configured to install the device driver in the client device; and
installing the device driver in response to the client device auto-launching the installer program.

5. The method of claim 1, wherein the filter driver is further configured to be removed from the client device in response to the device driver being uninstalled from the client device.

6. The method of claim 1, wherein the first device comprises one or more of a printing device, a copier, a fax machine, a webcam, a television, a set-top box, or a camera.

7. The method of claim 1, wherein coupling the first device to the client device further comprises:
coupling the first device to the client device using a universal serial bus (USB) link.

8. The method of claim 1, further comprising:
providing one or more services associated with the first device to the client device whenever the first device is subsequently re-coupled to the client device.

9. The method of claim 1, wherein the virtual storage drive is a virtual compact disk (CD) drive.

10. An apparatus comprising:
a virtual compact disk (CD) drive storing an installer program;
a device driver; and
a mass storage interface, wherein the mass storage interface is configured to enumerate the virtual CD drive to a client device in response to the apparatus being coupled to the client device for the first time;
wherein the installer program is configured (i) to install the device driver in the client device, and (ii) to install a filter driver in the client device subsequent to installing the device driver in the client device, the filter driver configured to prevent the client device from detecting the virtual CD drive whenever the apparatus is subsequently re-coupled to the client device, and
wherein the filter driver is installed by inserting the filter driver into a driver stack of the client device.

11. The apparatus of claim 10, wherein the filter driver is configured to prevent an auto-play program from being executed in the client device in response to the apparatus being re-coupled to the client device.

12. The apparatus of claim 10, wherein the filter driver is further configured to be removed from the client device in response to the device driver being uninstalled from the client device.

13. The apparatus of claim 10, wherein the apparatus comprises one or more of a printing device, a copier, a fax machine, a webcam, a television, a set-top box, or a camera.

14. The apparatus of claim 10, wherein the apparatus is coupled to the client device over a universal serial bus (USB) link.

15. A method comprising:
coupling a client device to a service providing device;
first enumerating, by the client device, the service providing device;
detecting, by the client device, during the first enumerating, a presence of a virtual compact disk (CD) drive in the service providing device; and
executing, by the client device, an auto-play program configured to auto-launch the virtual CD drive, thereby causing an installer program in the service providing device to install a device driver and a filter driver in the client device;
wherein the filter driver is installed by inserting the filter driver into a driver stack of the client device.

16. The method of claim 15, further comprising:
re-coupling the client device to the service providing device;
second enumerating, by the client device, the service providing device; and
preventing, by the filter driver installed in the client device, during said the second enumerating, detection of the virtual CD drive in the service providing device.

17. The method of claim 16, further comprising:
preventing, by the filter driver installed in the client device, during the second enumerating, execution of the auto-play program in response to the re-coupling.

18. The method of claim 16, further comprising:
uninstalling, by the client device, the device driver installed in the client device, along with uninstalling the filter driver installed in the client device.

19. The method of claim 15, wherein the coupling further comprises:
coupling the client device to the service providing device using a universal serial bus (USB) link.

20. The method of claim 15, wherein the service providing device comprises one or more of a printing device, a copier, a fax machine, a webcam, a television, a set-top box, or a camera.

* * * * *